(No Model.) 4 Sheets—Sheet 4.
E. LAMBINET.
INDICATOR OF MOTION AND SPEED OF STEAM AND LIKE MOTORS.
No. 406,222. Patented July 2, 1889.
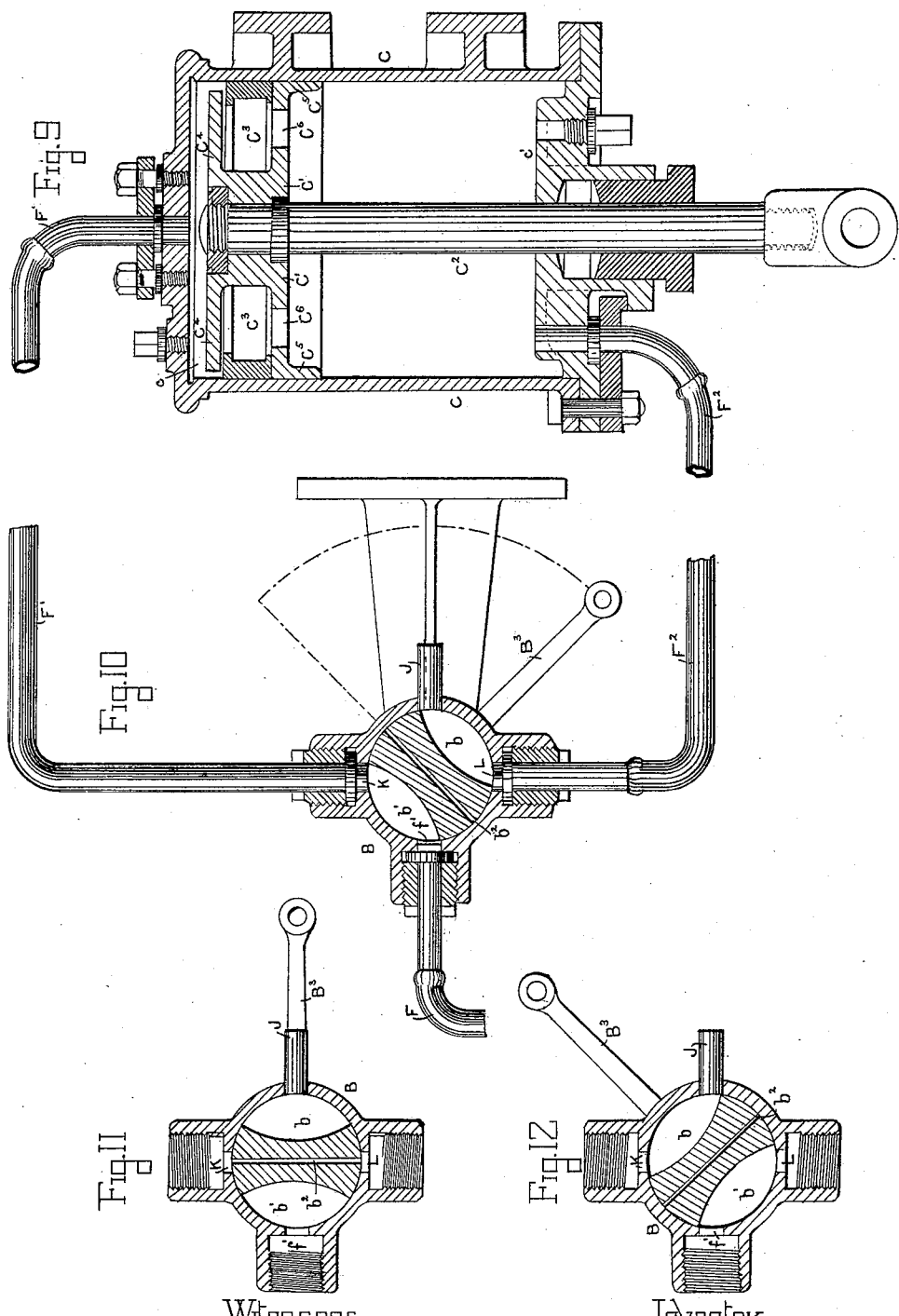
Witnesses. Inventor.

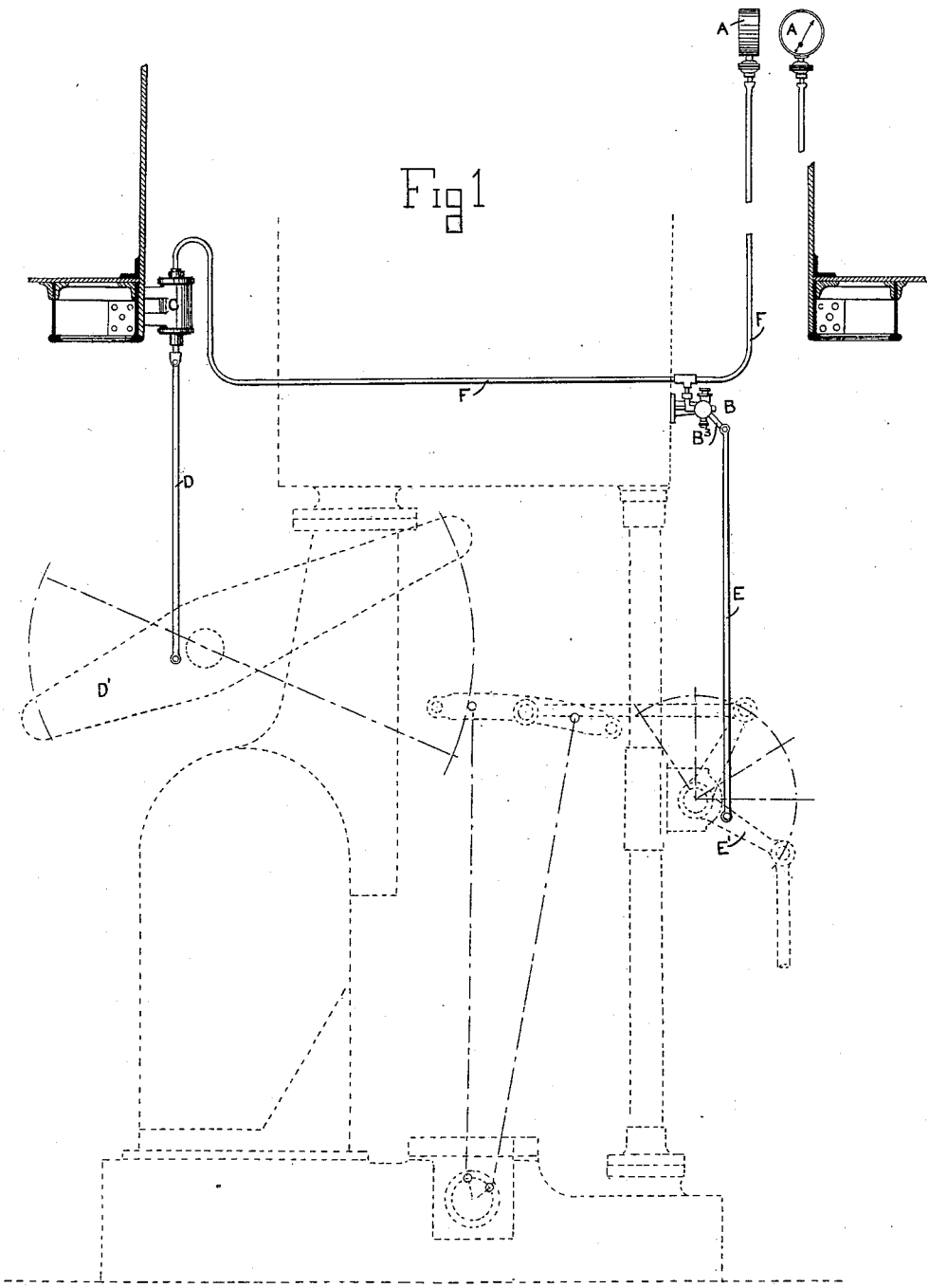

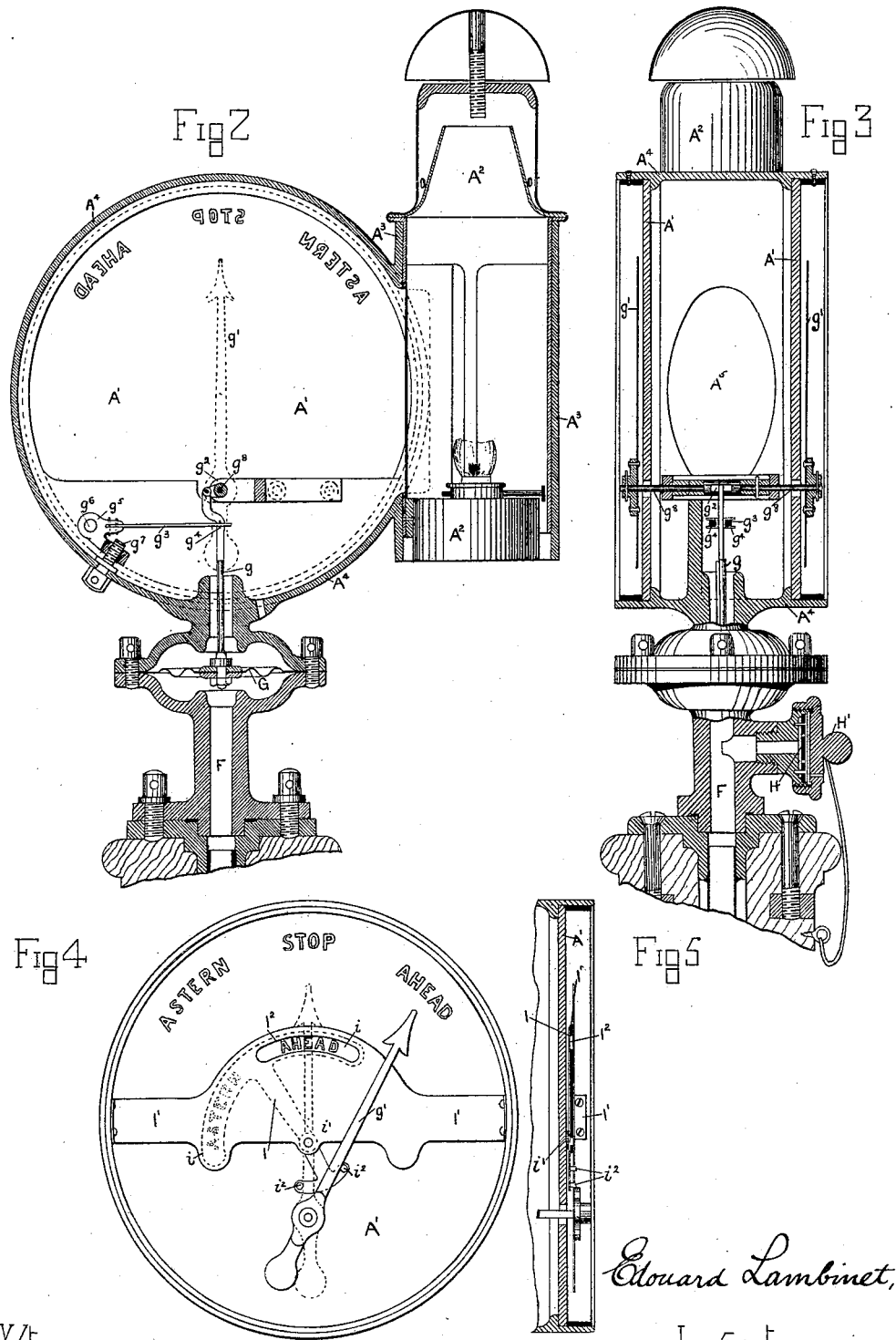

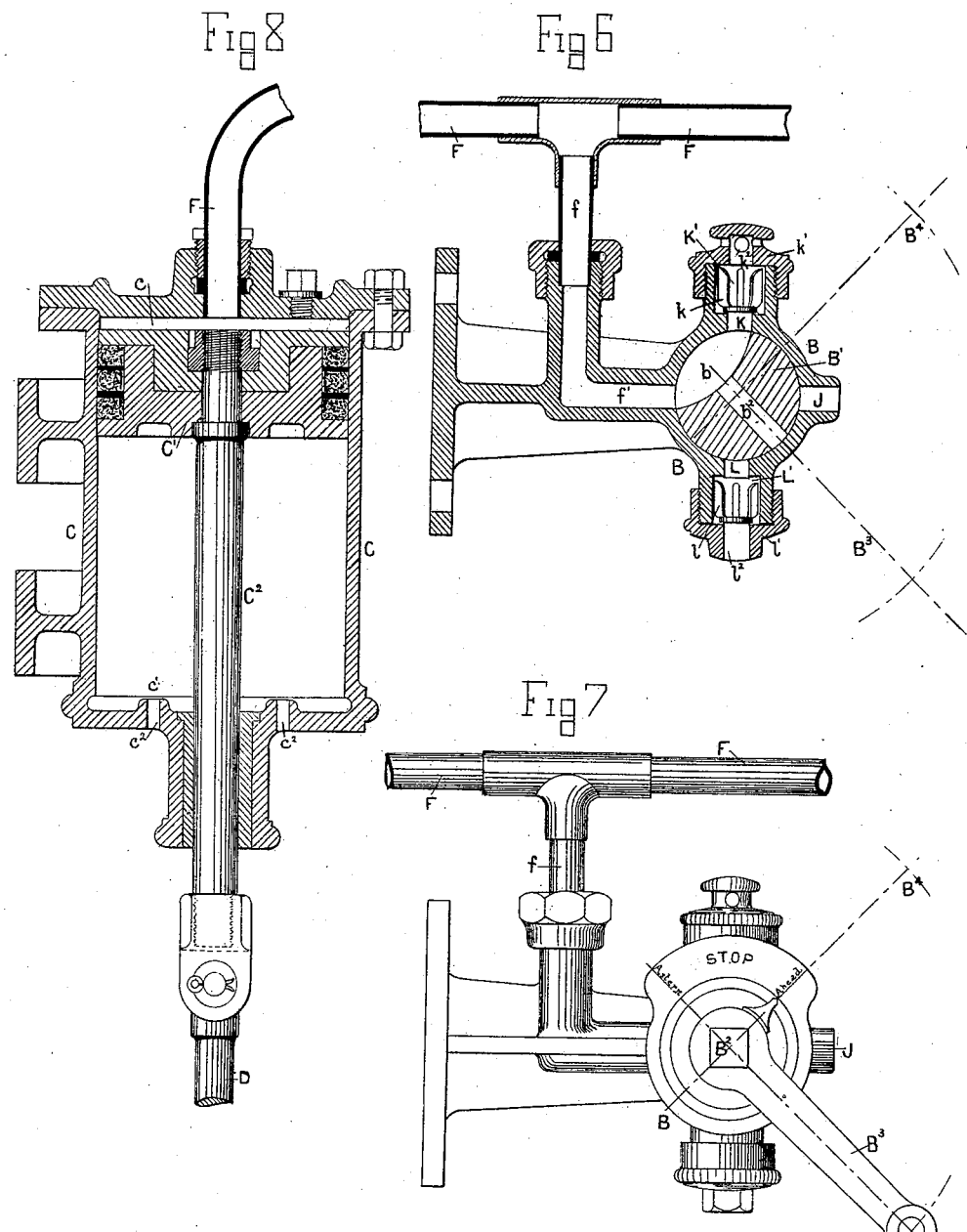

UNITED STATES PATENT OFFICE.

EDOUARD LAMBINET, OF MARSEILLES, FRANCE, ASSIGNOR TO J. GORDON ALISON & CO., OF BIRKENHEAD, ENGLAND.

INDICATOR OF MOTION AND SPEED OF STEAM AND LIKE MOTORS.

SPECIFICATION forming part of Letters Patent No. 406,222, dated July 2, 1889.

Application filed August 25, 1888. Serial No. 283,703. (No model.) Patented in France July 26, 1886, No. 177,597.

*To all whom it may concern:*

Be it known that I, EDOUARD LAMBINET, a citizen of France, residing at Marseilles, France, have invented certain new and useful Improvements in Apparatus for Indicating the Direction of Motion and Speed of Steam or other like Motors, (for which I have received Letters Patent in France, No. 177,597, July 26, 1886,) of which the following is a description.

This invention relates to those appliances which are used in engine-rooms and elsewhere for automatically indicating the direction and speed of the engine to which they are connected.

It has for its principal object the production of an automatic indicator which shall show the direction in which the engines are working or were last working, which shall give an indication of their speed, and which can also show at a glance whether it is itself in working order.

It consists, essentially, as regards the principal parts—

First. In an indicator dial and pointer, which latter shall oscillate with each stroke of the engine from zero-point to one side for "ahead" and from zero-point to the other side if the engines be going "astern."

Second. In a kicking apparatus worked by the pointer, or the air in the tube, hereinafter described, which, whenever the hand passes the zero-point, shall kick over a pair of semaphores marked "ahead" or "astern," (or their equivalent,) so that whichever is the right indicator for the moment shall become visible preferably on the dial.

Third. In a tube connecting the diaphragm or piston of the indicating apparatus already referred to with the pump and valve, yet to be mentioned. This tube is filled with the fluid pumped—preferably air—and is fitted with a double whistle and cap, or cock, so that when the cap is withdrawn or the cock turned, whether the air in the tube be above or below atmospheric pressure, it shall give a whistle-note at each stroke of the engine.

Fourth. In a four-way cock worked from the reversing-engine or reversing-lever, and so arranged, in combination with the pump hereinafter described and the valves on the pump tube or cock passages, that when the engines are going one way—say, ahead—at every stroke of the engine the air in the tube shall range from atmospheric pressure to, say, $n$ pounds per square inch above it, and when the engine is going astern from atmospheric pressure to $n$ pounds per square inch of vacuum.

Fifth. In a pump consisting of a cylinder, and a piston which is caused to reciprocate at every stroke of the engine. One or both ends of the cylinder are connected by a tube or tubes with the four-way cock in such manner that there shall be alternately $n$ pounds of vacuum or pressure and zero on the tube as the engine is going ahead or astern.

The way in which I accomplish the object of my invention is set forth in the following description, reference being had to the accompanying drawings, in which—

Figure 1 is a general view of my invention as it might be applied to a vertical marine engine, and is shown only to illustrate more clearly the working of the apparatus, the parts not included in my invention being shown in dotted lines; Fig. 2, a sectional elevation of the indicator proper, with lamp attached Fig. 3, a similar section at right angles to Fig. 2. Figs. 4 and 5 illustrate the method of actuating the semaphores, Fig. 4 being an elevation, and Fig. 5 a sectional elevation through one dial face, taken at right angles to Fig. 4. Fig. 6 is a transverse section, and Fig. 7 elevation, of the four-way cock, which is employed when the pump is connected therewith by one tube only. Fig. 8 is a longitudinal section of pump when provided with one tube only; Fig. 9, similar section of pump with two tubes attached; Fig. 10, transverse section of four-way cock (with its connections) as used in conjunction with the pump, as shown in Fig. 9. Figs. 11 and 12 show the positions of the plug of foregoing cock in the middle of its travel, and at the opposite end of its travel to that shown in Fig. 10.

In the drawings like letters refer to like parts.

Referring first to Fig. 1, A is the indicator in side and front elevation. B is the four-way cock, having a connection on the one hand with the indicator A, and on the other with the pump C. All three (A, B, and C, indicator, cock, and pump) may be placed in any convenient position relative to the engine, starting-platform, or bridge. The four-way cock B and pump C are here shown with only one connecting-tube. The piston-rod of the pump is connected by a rod D or other suitable attachment to some part of the engine—such as the air-pump lever D'—which gives to the lever D a movement similar to that of the engine-piston, but reduced in amount. By this means the pump-piston makes one stroke for each stroke of the engine. The actuating arm or lever $B^3$ of the four-way cock B is connected by a rod E or other attachment to the reversing-engine or reversing-lever E' of the main engine, or to some part which has a similar movement to the reversing-lever E, so that when the said lever (or its equivalent) is in its three positions of "ahead," "stop," or "astern," the actuating-lever $B^3$ is at the commencement, middle, or end of its stroke.

Referring to Figs. 2 and 3, in the end of the indicator-tube F, I place a diaphragm G, preferably corrugated, as in an aneroid, and to the center of this I attach a stem $g$. This, when moved by the vibrating diaphragm G, actuates the pointer or pointers $g'$, through the medium of the lever $g^2$, or by a crank or rack and pinion, or other known device. The pointer (or pointers) is held normally to zero or "stop" by a light spring $g^3$, which engages with the studs $g^4$ on the stem $g$. The spring $g^3$ is fixed at the other end to a piece $g^5$, which is pivoted to the indicator-case at $g^6$, and may be adjusted from the exterior by the screw $g^7$. The particular indicator shown has two dial-faces A' and two pointers $g'$ on the same spindle $g$, (which carries the lever $g^2$,) so that the indicator may be read from either side. To avoid confusing the words of command on one dial with those on the other, the dial-plates are preferably made of ground glass or some other semi-transparent substance.

The lamp $A^2$ is carried in a socket $A^3$, provided for that purpose on the side of the indicator-case $A^4$, and may be removed therefrom as required. It illuminates the interior of the indicator through the aperture $A^5$.

On the indicator-tube F, and preferably near to the diaphragm G, is fitted the double whistle H, preferably having a different note for sucking in to what it has for blowing out, and provided with a cap H', or a cock, so that when the cap is removed or the cock turned a whistle-note will be given at each stroke of the engine—say shrill for "ahead" and bass for "astern"—the note being dependent upon whether the air in the tube be above or below atmospheric pressure. In most cases, however, it will do with only one note, as the whistle is mainly used to ascertain whether the apparatus is working right.

The working of the semaphores may be seen from Figs. 4 and 5. They are preferably mounted on the same side of the dial-plate as the pointers $g'$, by which they are actuated, each dial being provided with a pair. Each of the arms $i$ of the anchor-shaped lever I forms a semaphore which bears the word of command "ahead" or "astern" (or their equivalents.) The lever I works behind, and is pivoted at $i'$ to a bridge-plate I', in front of which the pointer $g'$ oscillates. The plate I' has in it an opening $I^2$, through which that semaphore is visible which bears the word of command corresponding to the direction in which the engines are going or were last going, the other semaphore being hidden behind an opaque part of the plate, as shown in dotted lines. The end of the lever I remote from the semaphores is formed T-shaped and carries two projecting pins $i^2$, with which the pointer $g'$ engages as it oscillates between its two extreme positions. The pins $i^2$ are so located with reference to the pointer that, when the engine is going ahead, the latter oscillates (for reasons hereinafter stated) between zero or "stop" and "ahead," the lever I remains stationary, and the semaphore bearing "ahead" is alone visible. As soon as the engine is reversed the pointer passes the zero or "stop" point toward "astern," and, engaging with one of the pins $i^2$, swings over the lever I and brings the "astern" semaphore into view, where it remains until the engine is again reversed. It will be seen from this that when the engine is stopped that semaphore will remain in view which indicates the direction the engine last took. Though this is a convenient way of actuating the semaphores, it will be obvious that many other ways the mechanical equivalent of this might be adopted.

In order that the indicator may give a correct register of the direction of movement of the engine, it is necessary that there shall be a constant relation between the pressure or vacuum brought to bear on the under surface of the diaphragm G and the direction in which the engine is working. For the sake of simplicity I will suppose that throughout the following description, unless otherwise stated, the apparatus is so constructed that as the engines go "ahead" there is more or less vacuum acting on diaphragm G, and as they go "astern" there is more or less pressure acting on diaphragm G, zero being taken at atmospheric pressure. Of course these conditions could be reversed, if desired. Now, the piston of the pump C has a constant reciprocating movement irrespective of the direction of revolution of the engine, and therefore the pressure or vacuum produced in that pump would not vary with the direction of revolution. In order to produce this necessary variation I place between the indicator and pump, and in connection with the indicator-tube F, a four-way cock B—such as was hereinbefore mentioned—and in conjunction with said cock I use one or more valves, for the purpose shortly to be described. I may place the valve or valves in the piston C', or the piston may be itself a large valve, as in Fig. 9, or the valves may be on the four-way cock, as in Figs. 6 and 7, or on the pipes or passages. The four-way cock may be connected with the pump C by one or two tubes, as preferred, the object attained being the same in both cases. If one tube be used, I prefer to construct the apparatus in the way set forth in Figs. 6, 7, and 8, though it may be considerably varied in detail and arrangement without diminishing its efficiency.

C', Fig. 8, is the pump-piston, of any usual construction, the piston-rod $C^2$ being connected to the engine by rod D, as shown in Fig. 1. One end $c$ of the pump-cylinder communicates with the indicator-tube F, the other end $c'$ having free access to the air by apertures $C^2$. The four-way cock B may be in the direct line of the pipe F, but I prefer to connect it therewith by a short branch pipe $f$. B' is the plug, the neck $B^2$ of which is provided with an arm $B^3$. To the outer end of this arm is pivoted the rod E, Fig. 1, by means of which the cock is caused to move synchronously with the reversing-lever of the engine. The cock-shell has in it four openings, distributed equally round the plug. The first $f'$ opens sidewise into the branch tube $f$; the second J, on the opposite side of the shell, is open to the outside air; the third K opens upward into an exit-valve K', while the fourth L communicates downward with an inlet-valve chest L'. Both valve-chests are provided with covers $k'$ and $l'$, through which there is a communication to the outside air by apertures $k^2$ and $l^2$. The exit-valve $k$ opens only when the pressure below it exceeds that of the atmosphere, while the inlet-valve $l$ will only open when the pressure above it is less than atmospheric pressure. The plug B', I frequently hollow out, one or both sides, so that it will "open" through wide limits; also the form of the plug and the passages therein may be varied considerably, according to the arrangement of valves and tubes. I could use a plug with two widely-scooped channels, or one with the ordinary two narrow passages, but the form I prefer (in a cock having only one tube F) is that shown in Fig. 6, another form (hereinafter described) being used in cases where there are two connecting-tubes. On one side of the plug B', I scoop out a deep channel $b$, wide enough to reach between the remote edges of any two adjacent openings in the shell, and I bore a hole $b^2$ through from channel $b$ to the opposite side of the plug. As the piston C' nears the end $c$ of the cylinder it tends to compress the air in tube F and raise the diaphragm G. Should the engine be going "ahead," the plug B' and the arm $B^3$ are in the position shown in Figs. 6 and 7, there is a free passage from tube F through tubes $f f'$, $b$, and R to the exit-valve $k$, and any increase above atmospheric pressure in those passages is prevented by the exit-valve rising and allowing air to escape; also, as piston C' recedes from end $c$ its tendency is to produce a partial vacuum in tube F and to depress diaphragm G. This it succeeds in doing, as the valve $k$ is held against its seat by the pressure of the outside air. From this it will be seen that neither on the ingoing nor outgoing stroke of the pump can this pressure in tube F rise above that of the atmosphere so long as the plug is in the position shown—that is, so long as the engine is going "ahead," so that in this case the diaphragm G can only be depressed from its normal position. Should the engine be reversed, the arm $B^3$ takes the position shown by line $B^4$, turning the plug, so that communication with valve $k$ is cut off, and inlet-valve $l$ is open to tube F. This valve opens should the pump tend to produce a vacuum, and destroys said vacuum; but it closes as soon as the pressure behind it reaches atmospheric pressure. Consequently when the engine is going "astern" it is impossible to reduce the pressure in tube F below that of the air outside, and the diaphragm G can only be raised above its normal position. As the lever $B^3$ passes the point of "stop," the hole $B^2$ in the plug opens up a communication between the outside air and that in tube F, and so restores the equilibrium within the tube.

In cases where it is desirable to use two connecting-tubes $F' F^2$, I prefer to make the apparatus in the form shown in Figs. 9 to 12. The end $c$ of the pump is connected by the tube $F'$ with the cock-passage K, and the end $c'$ by tube $F^2$ with the passage L. J and $f'$ communicate, as in Fig. 6, with the outside air and the indicator-tube respectively. Instead of placing an exit and inlet valve on the cock B, I make the piston C' itself into a valve. The loose ring $C^3$ plays between the flanges $C^4$ and $C^5$ of the piston. On the ingoing stroke the piston is held by its own inertia against the flange $C^5$, and the air from the end $c$ of the cylinder passes between flange $C^4$ and ring $C^3$, and through the apertures $C^6$ in flange $C^5$ to the other end $c'$ of the cylinder. On the outgoing stroke the ring $C^3$ is pressed against flange $C^4$, and there is no communication through the piston between the two ends of the cylinder. The plug B' has two channels $b$ and $b'$ on two opposite sides, their position relative to the arm $B^3$ being the same as in Fig. 6. The hole $b^2$, however, runs through the center of the plug, parallel to the two channels, and not at right angles to them, as in Fig. 6. As the engine goes "ahead" the plug is in the position shown in Fig. 10, the tube F being in communication with the end $c$ of the cylinder by means of the channel $b'$. On the ingoing stroke the air in end $c$ rushes through the holes $C^6$ into $c'$, thus preventing a rise of pressure in tube F. On the outgoing stroke the piston-valve closes, and a partial vacuum is formed in end $c$, and therefore in tube F, the air from end $c'$ passing out at orifice J by means of tube $F^2$, orifice L, port $b$, and exit J. Conversely, when the engine is reversed and the plug is in the position shown in Fig. 12, the tube F communicates with the end $c'$ of the cylinder by means of port $b'$ and tube $F^2$, the end $c$ being open to the air through tube F, space $b$, &c. The outgoing stroke drives the air in end $c'$ through tube $F^2$ and space $b'$ into tube $F^x$, and causes the pressure therein to rise above atmospheric pressure, while on the ingoing stroke the piston-valve opens, and there is a free communication between tube F and the outside air, (by means of port $b$, tube $F^2$, end $c'$, port $C^6$, end $c$, tube $F'$, port $b$, and exit J,) which prevents the pressure in tube F from falling below that of the atmosphere. It will thus be seen that the intimate effect produced by this form of apparatus is the same as that obtained by the arrangement shown in Figs. 6, 7, and 8—namely, as the engine goes "ahead," the diaphragm G is depressed from its normal position, and as it goes "astern" the diaphragm is raised above its normal position. The hole $b^2$ as the plug passes the "stop" point serves to establish an equilibrium between the two ends of the pump C, as may be seen from Fig. 11.

The mode of operation is as follows: The engine being at rest, the air in the tube F is at atmospheric pressure, the diaphragm G in its normal position, and consequently the pointer $g'$ is at zero or "stop," the semaphore $i$ showing either "ahead" or "astern," according to the last motion of the engine. The word of command "ahead" is given. The engine being put ahead, the piston C' reciprocates with it at each stroke, causing a difference of pressure in tube F, varying from zero to $n$ pounds per square inch below it. As a result, the diaphragm G vibrates between its normal point and any point below it, and thereby causes the pointer $g'$ of the instrument to oscillate at each stroke between zero (stop) and "ahead." The command is given "stop." The engine is stopped and the motion of the pump ceases. The tube-pressure rises to zero and the pointer indicates "stop," but the semaphore still shows "ahead." The command is now given "astern." The engine is reversed astern, the pump again works, but the needle now oscillates between "stop" and "astern" on the dial, kicking the semaphore over to "astern" as it passes the zero or "stop" point. The needle oscillating once with each stroke, the captain on the bridge or the engineer on the platform can count the speed of the engine. It also shows the apparatus to be in good working order; also, by its means the captain or engineer can see how the engines are working before the ship gets under way, so that if a mistake be made in the engine-room it will be instantly seen by the officer in command and countermanded.

No claim is made herein to the indicator proper shown in Figs. 2, 3, 4, and 5, as that forms the subject-matter of an application filed July 23, 1887, by James G. Alison, Serial No. 245,110.

I claim as my invention—

1. In an indicator for engines, the combination, with the engine, of a pump connected therewith and actuated thereby, an indicator connected with the pump by means of a pipe, a valve located in the pipe, and a connection between the valve and the reversing-lever of the engine.

2. In combination with an engine, a pump operated thereby, a pipe F, connected with the pump and provided with an inlet-valve L and outlet-valve K, an indicator, a diaphragm connected with the indicator and placed within the pipe F, and a connection between the valves L K and the reversing-lever of the engine, whereby one valve is free to rise and fall with difference in pressure when the engines are going ahead and the other only when they are going astern.

3. In combination with an engine, a pump operated synchronously thereby, a pipe connected with the pump, an indicator, a valve or cock in pipe F, operated by the reversing-lever of the engine, all substantially as shown, and a diaphragm placed in the pipe F and serving to actuate the pointer of the indicator by variations in the pressure within the pipe.

4. In an indicator, the combination, with a case or shell, of a pipe communicating therewith, a pointer pivoted in the casing, a diaphragm connected with the pointer and placed within the pipe, or an extension thereof, and means for varying the pressure beneath the diaphragm.

5. In an indicator, the combination, with a case or shell, of a pipe communicating therewith, a pointer pivoted in the casing, a diaphragm placed within the pipe and connected with the pointer, a semaphore operated by the pointer, and means for varying the pressure upon the diaphragm.

6. In combination with an engine, a pump actuated synchronously by the engine, an indicator, an expansible and contractible device, connected with and actuating the indicator, and a pipe adapted to convey the pulsations of air or other fluid caused by the pump to the expansible and contractible device.

7. In an indicator for engines, the combination, with an engine and an indicating mechanism, of a cylinder C, pipes $F'$ $F^2$, communicating with opposite ends of the cylinder, a piston C', actuated by the engine and provided with a valve $C^4$, opening in one way only, and a four-way valve B, with which the pipes $F'$ $F^2$ communicate, located between the indicating mechanism and the cylinder.

8. In combination with cylinder C and piston C', pipes $F'$ $F^2$, communicating with the cylinder, an indicator, a four-way valve, and a pipe F, connecting the valve with the indicating mechanism, whereby the pulsations conveyed by said pipe shall operate the indicator.

9. In an indicator for engines, the combination, with a pump operated synchronously by the engine, of an indicator, a pipe connecting the indicator and pump, and a four-way valve B, located in the pipe between the indicator and pump.

10. In an audible indicator for engines, the combination, with the engine, of a pump operated synchronously thereby and a whistle connected with the pump, all substantially as shown.

11. In an audible indicator for engines, the combination, with the engine, of a pump operated synchronously thereby, a whistle connected with and operated by the pump, and a stopping device H'.

12. In combination with a casing provided with a dial having the neutral point at the top, a pointer pivoted in the casing and adapted to maintain, normally, an upright position, a diaphragm G, exposed to pulsations of a fluid and connected with the pointer, whereby the pulsations will cause the pointer to oscillate to one or the other side of the neutral line, according as the pulsations are above or below a predetermined degree.

13. In an indicator, the combination of an air-pump, an indicator provided with a pointer, a diaphragm connected with and adapted to actuate the pointer, a pipe connecting the pump with the chamber in which the diaphragm is placed, whereby when the pressure of the air is above atmospheric pressure it will move the pointer in one direction, but when below atmospheric pressure it will move it in the reverse direction.

In testimony whereof I have signed my name to this specification in the presence of two subscribing witnesses.

EDOUARD LAMBINET.

Witnesses:
CÉSAR DE GASTILLON,
MARIUS RAUBAUD.